United States Patent
Pankow et al.

(10) Patent No.: US 10,829,068 B2
(45) Date of Patent: Nov. 10, 2020

(54) METHOD AND APPARATUS FOR GLOBALIZED PORTABLE OCCUPANT VEHICLE SETTINGS

(71) Applicant: FORD GLOBAL TECHNOLOGIES, LLC, Dearborn, MI (US)

(72) Inventors: Bradley Pankow, Midland, MI (US); Hamid M. Golgiri, Dearborn, MI (US); James Issac, Ypsilanti, MI (US); Adam Thomas Rainey, Ann Arbor, MI (US); Stephen Schmidt, Troy, MI (US); Patrick Lawrence Jackson Van Hoecke, Dearborn, MI (US); Matthew Wolfe, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

(21) Appl. No.: 15/701,559

(22) Filed: Sep. 12, 2017

(65) Prior Publication Data

US 2019/0077346 A1 Mar. 14, 2019

(51) Int. Cl.
| | |
|---|---|
| *B60R 16/037* | (2006.01) |
| *B60R 25/20* | (2013.01) |
| *H04W 4/44* | (2018.01) |
| *B60R 25/25* | (2013.01) |
| *B60R 25/30* | (2013.01) |
| *H04L 29/08* | (2006.01) |
| *H04W 4/00* | (2018.01) |

(52) U.S. Cl.
CPC ........ *B60R 16/037* (2013.01); *B60R 25/2081* (2013.01); *B60R 25/25* (2013.01); *B60R 25/305* (2013.01); *H04W 4/44* (2018.02); *H04L 67/12* (2013.01); *H04L 67/306* (2013.01); *H04W 4/00* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 2014/0200737 A1* | 7/2014 | Lortz | ...................... | B60R 25/25 |
| | | | | 701/1 |
| 2014/0309813 A1* | 10/2014 | Ricci | ..................... | G06F 16/583 |
| | | | | 701/2 |
| 2016/0101783 A1 | 4/2016 | Abou-Nasr et al. | | |
| 2016/0368509 A1 | 12/2016 | Uppal | | |
| 2017/0232914 A1* | 8/2017 | Brenner | ................ | B60R 16/037 |
| | | | | 701/36 |
| 2019/0038204 A1* | 2/2019 | Beck | ........................ | A61B 5/18 |

* cited by examiner

*Primary Examiner* — Tyler D Paige
(74) *Attorney, Agent, or Firm* — Michael Spenner; Brooks Kushman P.C.

(57) ABSTRACT

A system includes a processor configured to receive a set of vehicle-specific, user-specified vehicle physical system settings for a first vehicle. The processor is also configured to use a known first vehicle physical configuration to convert the system settings into user-centric settings, representing at least spacing between physical components achieved in the first vehicle by the user-specified settings. The processor is further configured to save the converted user-centric settings with respect to a user profile.

20 Claims, 4 Drawing Sheets

METHOD AND APPARATUS FOR GLOBALIZED PORTABLE OCCUPANT VEHICLE SETTINGS

TECHNICAL FIELD

The illustrative embodiments generally relate to methods and apparatuses for globalized portable occupant vehicle settings.

BACKGROUND

People come in all shapes and sizes. To accommodate this, vehicles have long provided user-configurable vehicle settings, allowing for adjustment of seats, mirrors, steering wheel positions, pedal positions, lumbar supports, etc. These settings allow a user to customize the vehicle physical experience, both to improve the safety of driving and to improve the comfort of the ride.

In more recent time, such settings have been associated with various keys that allow a user to save a certain set of settings with respect to a certain key/fob. When the user uses the specific key/fob to unlock or open a vehicle, the previously configured settings are loaded into the vehicle and the vehicle configures the internal configurable systems in accordance with the settings. This allows for the vehicle to revert to an easy-egress state when a user exits, and allows for multiple drivers of a vehicle to have preset and varied seat and mirror configurations.

While vehicle ownership is still the most common model for vehicle usage, a trend towards on-demand vehicle usage is growing. These short-term rentals allow users to pay to use a vehicle for a few hours or even less, and they typically involve a fleet of vehicles that are not all the same make and model. Accordingly, each time a user rents or borrows a vehicle, that user may have to find the particular setting controls and set the settings to accommodate at least safe mirror positions. While seat positioning may not be as important to a user as being able to see traffic, the user must also spend time configuring a seat or experience a drive that is less comfortable than it needs to be. Because different vehicles have different sizes, adjustable systems and various clearances and angles, simply importing a setting from one vehicle model to another is not a common practice, as it would almost always result in a final setting that was not as comfortable in the new vehicle as it was in the original (where it was set).

SUMMARY

In a first illustrative embodiment, a system includes a processor configured to receive a set of vehicle-specific, user-specified vehicle physical system settings for a first vehicle. The processor is also configured to use a known first vehicle physical configuration to convert the system settings into user-centric settings, representing at least spacing between physical components achieved in the first vehicle by the user-specified settings. The processor is further configured to save the converted user-centric settings with respect to a user profile.

In a second illustrative embodiment, a system includes a processor configured to receive a set of user-centric settings, defining spacing between physical components or sight angles preferred by a user. The processor is also configured to receive a set of physical component placements for a specific vehicle. The processor is further configured to convert the user-centric settings to specific settings for the specific vehicle to achieve the spacing or sight angles in the specific vehicle, based on the physical component placements and wirelessly deliver the converted settings to the specific vehicle.

In a third illustrative embodiment, a system includes a processor configured to detect a user approaching a vehicle and responsively capture a user-image using a vehicle camera. The processor is also configured to determine a user physical characteristic from the user image and automatically adjust a vehicle physical component to accommodate the physical characteristic, to at least avoid a projected contact between the user and a vehicle physical element.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
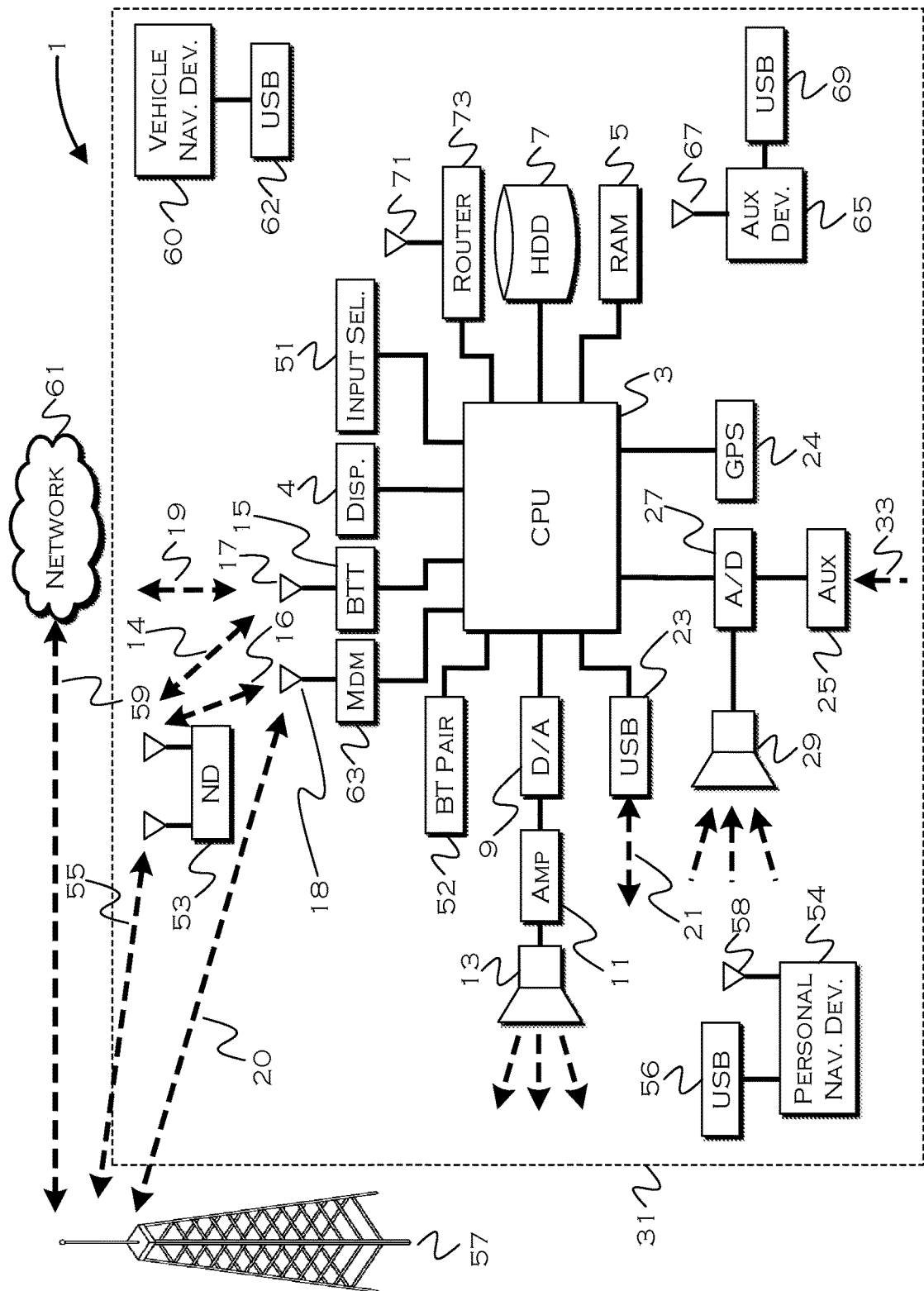
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While vehicles tend to vary wildly in shape, size, angles and clearances from model to model, each model itself tends to have a fixed set of parameters. That is, every 2016 FORD EXPLORER SPORT, for example, has a fixed forward cabin size and one of two rear seating options. Consequently, if a user configured seating positions for one of these vehicles, that user could export the settings to another one of the vehicles and have the same result as when driving the configured original.

Each one of the settings in the preceding example, however, is typically considered with respect to the model in question. That is, a seat may be 6 cm from a rear-most position and a steering wheel may be lowered 4 cm from an uppermost position. Mirrors are set with angles that have a measurable position with respect to a vehicle component (frame or pillar, for example) or from a known initial position. Accordingly, while this makes it easy to import the settings to another vehicle with the same interior parameters and cabin structure, those same offsets and angles applied to a different model would result in a wholly different user experience.

On the other hand, the one thing that remains relatively constant when a user switches vehicles is the user themselves. A user's height (after a certain age) rarely changes, nor do arm or leg lengths, and even weight varies quite slowly. So, even if a user changes a seating angle to accommodate a growing stomach with time, the user is unlikely to set a vehicle one day and need a wholly different setting to accommodate his/her stomach the next day, as people do not typically gain a great deal of weight from one day to the next.

The illustrative embodiments use the fact that people remain fairly static in configuration to adapt a set of user-configured vehicle settings to a user-centric set of settings. This effectively gives a globalized configuration set reflecting user preferences based on user physical characteristics, and these settings may be largely vehicle-agnostic. While users may want a more aggressive or relaxed seating position when driving a certain vehicle, the majority of the time the user will typically elect a seating position that is most comfortable for their body type, and that is the "feel" that the user would like in any vehicle.

By using a database reflecting the interior cabin configuration of various vehicle models, the illustrative embodiments can then adapt the user-centric globalized settings to a particular vehicle. So, for example, if a user configured a seat such that a leading edge of the seat was 2.5 feet from a set of pedals and 2 feet above the pedals, as long as a vehicle could accommodate that offset, any vehicle could be automatically configured to match these parameters and the user would have the same experience, because (presumably) this configuration was set based on a user leg length. Thus, by defining settings based on offsets, clearances, viewing angles, etc., the settings can be viewed in terms of the next affect on a user, as opposed to where a particular system in a particular model is set relative to its own maximum parameters.

It is also possible to accommodate dynamically measurable user characteristics, both to avoid potential issues and to provide similar user-centric settings when a user does not have a preset configuration of settings associated therewith. By viewing an approaching user, a vehicle camera can measure height and limb-length, and can adjust mirrors and seating, among other things, accordingly.

In the case where a tall, known user is driving a small car, knowing the user height can avoid modifying an imported seat setting that places the user's head against the cabin ceiling or placing a seat too far forwards for the user to fit comfortably between the seat and the steering wheel. In the same example, if the user were not known, modeling based on what other similarly sized users prefer can give a basis for attempting to provide a statistically likely appealing cabin setting, without the user ever entering a preference.

Accommodations such as this may also be important if many users share vehicles, as the vehicle settings can adaptively adjust to each user based on known preferences or based on physical characteristics as measured by vehicle systems. This can make a shared vehicle feel personally owned, and can encourage users to participate in shared vehicle ownership programs.

Figure 2:
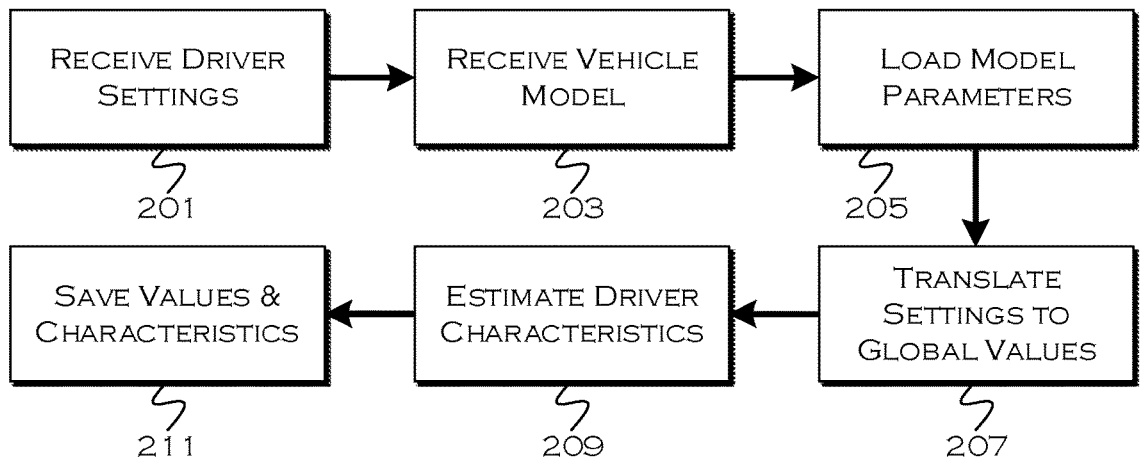
FIG. 2 shows an illustrative process for setting storage.

FIG. 2 shows an illustrative process for setting storage. In this example, the process converts a user-specified set of settings into a globalized set of settings that can be applicable to multiple vehicles. It is not necessary to know driver physical characteristics to engage this conversion, and, as can be seen, driver physical characteristics can even be estimated based on this conversion. The converted settings and characteristics are then stored with respect to a driver profile, so that the settings can be imported into any appropriately equipped vehicle driven by that driver.

In this example, the process receives 201 a set of user-configurable vehicle system settings input or controlled by a particular user. These can include, but are not limited to, seat positions, seat angles, mirror positions, mirror angles, steering wheel positions, pedal positions, etc.

Once the process receives the settings, the process receives 203 an indication of the vehicle model, and loads 205 a data set corresponding to the particular vehicle model in which the driver made the setting adjustments. Based on the data set, which provides parameters and distances within a cabin interior, among other things, the process converts 207 the current settings to global values.

With regards to seats, the process can calculate, for example, and without limitation, height of seating surface above floor, distance of seating back from steering wheel, distance of seat from pedals, etc. With regards to mirrors, viewing angles and offset angles can be calculated. Some of the calculations can assist in other calculations, and generally a model of the empty space and angles represented by the settings (space which a driver would partially fill and angles which would be useful to that driver) is formed. This space is essentially representative of the clearances and angles preferred by the particular driver when driving a vehicle, without necessarily having a specific relationship to the vehicle in which the space was defined. That is, if a driver would like 2.2 feet of distance between a seat back and a steering wheel, that distance is unlikely to change simply because the driver enters a new vehicle, as the driver's arms and torso remain the same size.

Also, in this example, the system may attempt to estimate 209 certain driver physical characteristics. Some of these characteristics may be measurable by in-vehicle cameras (e.g., if one knows the angle and height of a camera and the angle and height of a seat, then a view of the driver's head will allow for a torso height calculation) and others may be guessed based on vehicle system settings and determined as a range. In still another example, the characteristics may be predicted based on the fact that certain settings are the same as those commonly chosen by known people of certain physical characteristics. That is, if 90% of people who are 5 feet 9 inches tall choose a certain seat setting, and 75% of people overall who choose the same setting are 5 feet 9 inches tall, then there is a calculable statistical chance of 67.5% that the driver is 5 feet 9 inches tall. While this is merely a statistical model, other similar calculations with regards to other settings may increase the certainty and, at a minimum, a range of likely characteristics can be established (e.g., if no one under 5 feet 4 inches or over 6 feet 2 inches chooses the setting, the driver is likely between 5 feet 4 inches and 6 feet 2 inches tall.

Estimated driver physical characteristics can be useful in translating settings to other vehicles, and the process saves 211 both the converted settings and the estimated driver characteristics.

Figure 3:
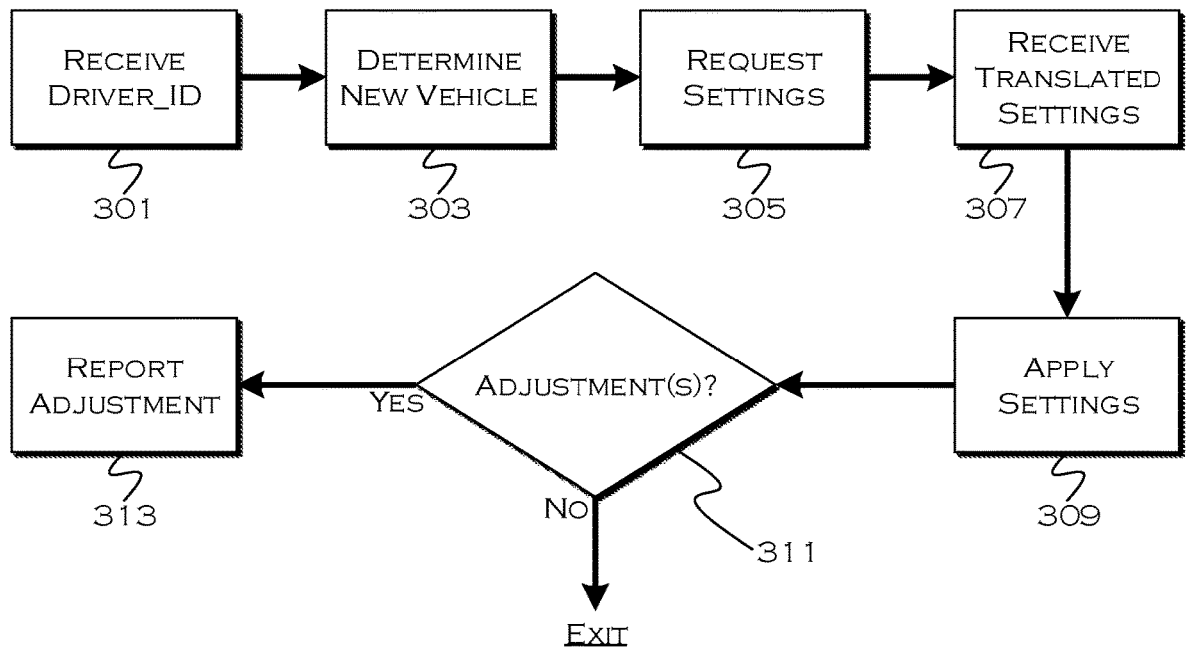
FIG. 3 shows an illustrative process for setting application.

FIG. 3 shows an illustrative process for setting application. In this example, the process receives 301 an identification associated with a driver. This can be obtained, for example, from a driver biometric, a phone ID, a wearable ID, facial recognition, a driver code, or any other reasonable method of determining a specific driver. The process also determines 303 that the identified driver has never driven this particular vehicle before, which means that it is unlikely that a set of settings has already been created and saved for that driver in this vehicle.

Accordingly, the process requests 305 a set of settings stored on a driver device or in the cloud, and stored with respect to a driver profile accessible or identifiable based on the driver identification. In this example, the process receives 307 an already-translated set of settings, which are essentially the driver's globalized preferences that have been converted to accommodate the present vehicle of interest. In other examples, the process (which may be executing onboard a mobile device or the vehicle) can perform the conversion on-site, and so instead may receive the globalized parameters and make the adjustments to accommodate the specific vehicle calculations locally.

The process, in this example, applies 309 the translated settings and an initial configuration corresponding to saved driver preferences, translated to the present vehicle, is then effectively presented to the driver. That is, when the driver enters the vehicle, the driver will find a set of spaces and angles between various vehicle components that looks and feels very similar to previously indicated preferred configurations, even though that driver has never driven or configured this vehicle before. Since there may be some aspects of the new vehicle cabin that cannot be fully accommodated by a converted setting, or because the driver may have a sore back, stiff legs, etc., the driver may make certain adjustments 311 to the converted settings. In this example, those adjustments are reported back to the driver profile, for inclusion in the global settings as appropriate (e.g., they may have to occur more than once to be reflected as a new preference, as opposed to a one-off accommodation of a one-instance occurrence).

Figure 4:
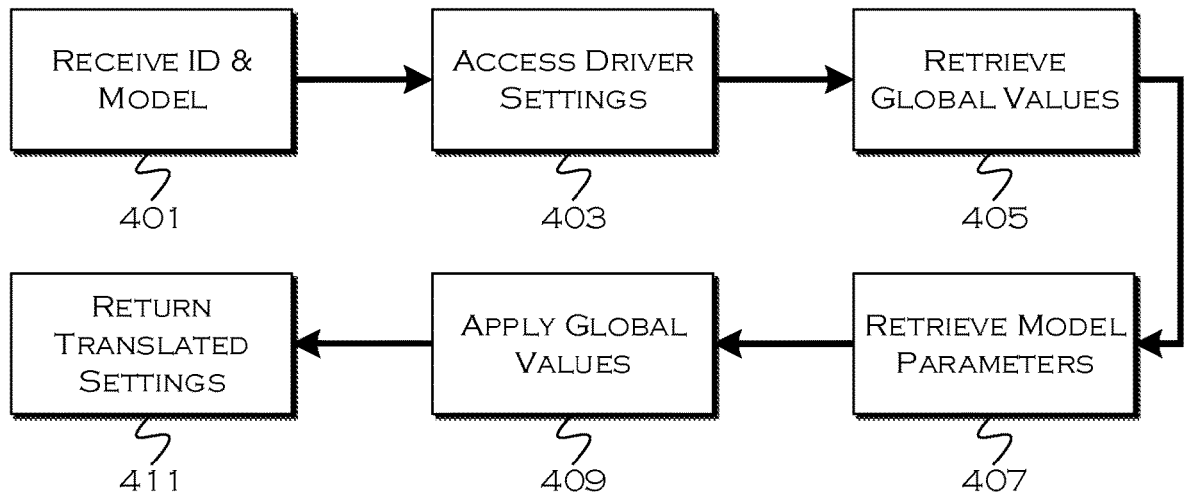
FIG. 4 shows an illustrative process for setting modification.

FIG. 4 shows an illustrative process for setting modification. In this example, the process receives 401 a driver identification and a vehicle model identification. If the vehicle model has more than one possible interior configuration, the model identification may include at least sufficient data to determine the particular configuration. Vehicles may also be specifically identified, so that specific interior configurations can be referenced in a database of specific vehicle configurations.

The process uses the driver identification to access 403 a set of globalized driver-centric preferences defined for the known particular driver. This allows the process to receive 405 the globalized values defined for that driver. The process also receives 407 the model parameters relating to the specific vehicle or vehicle model, which provides the processor with the physical characteristics of the particular vehicle of interest.

Next, the process engages in a conversion 409 of the global setting values to accommodate and adapt to the physical characteristics of the model. The result of this conversion is a set of model-specific settings that will closely mirror the feel of the settings as set in the original vehicle. Among other things, this can result in seat position and angle settings, mirror position and angle settings, steering wheel position settings, etc. As noted before, because the settings are driver-centric, this conversion can effectively re-create a set of spaces and angles that reflect the original driver preferences as applied in the original vehicle where the settings were set, so that the new vehicle has the same relative positioning of adjustable components and the driver essentially has a familiar space within which to operate the vehicle. The process then returns 411 the translated settings to the vehicle of interest, which is typically the vehicle having requested the setting adjustments.

Figure 5:
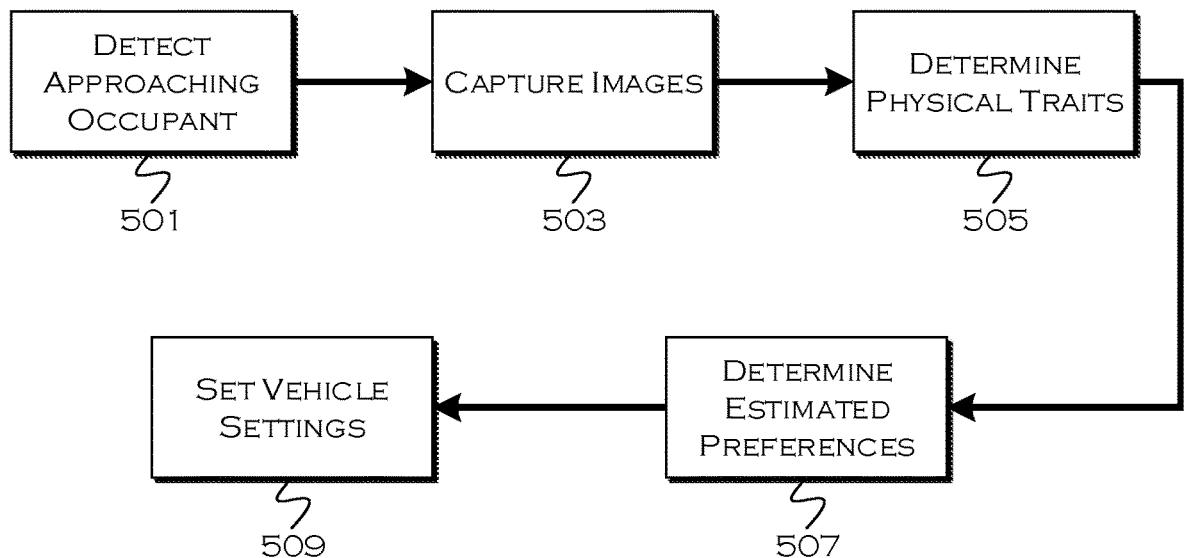
FIG. 5 shows an illustrative process for dynamic setting configuration.

FIG. 5 shows an illustrative process for dynamic setting configuration. In this example, the vehicle may not have access to driver preferences, or there may not be a defined set of driver preferences associated with a specific driver. Additionally or alternatively, the same concepts relating to driver settings may be applied to other occupants, and those settings may not be commonly saved. Thus, with respect to occupants, it may be more common to perform the adjustments dynamically and responsive to occupant characteristics.

Here, the process detects 501 approaching occupant using, for example, a vehicle camera. Vehicles can also capture approaching user characteristics from user physical data captured using a variety of onboard vehicle sensing capabilities, including, but not limited to, cameras, LIDAR, radar, etc The process uses the camera to view the occupant and capture 503 one or more occupant images. Based on these images, the process can determine 505 height, width, limb-length, etc. of the occupant, and at least can determine the relative lengths even if a true value is indeterminate (because, for example, the processor lacks a fixed point of reference for comparison).

Then, in this example, the processor can dynamically determine 507 recommended configurable settings for the occupant based on user physical traits. While these may not be the "ideal" settings for a particular person, these settings can help provide minimum clearances and comfort levels, so that even if the occupant does not elect to adjust a seat to a perfect position, the occupant is likely not going to be uncomfortable in the dynamically recommended position. The process then sets 509 the dynamically determined settings.

One method that can be used for dynamic adjustment is to provide for minimum clearances between fixed vehicle objects (dashboard, seatback, door, roof, etc) based on occupant physical characteristics. This at least ensures that the occupant is unlikely to bang into any fixed vehicle object upon entry into the vehicle or be physically obstructed by a fixed vehicle object. Another usable method includes accessing a database reflecting the common preferences associated with certain physical characteristics and applying those preferences based on observed user characteristics. In such an example, the user is provided with the settings that other similar users commonly prefer for that vehicle, and this will typically ensure that a reasonable approximation of comfort is achieved.

It is also possible to globalize the crowd-sourced user settings in a manner similar to the individual settings, and to dynamically apply the globalized settings for a "generic user" of certain characteristics to a particular vehicle model. So, for example, while there may only be eleven data points for a given vehicle model for a six foot six inch tall user, there may be ten thousand data points for the typical angles and clearances preferred by other users of that size. By globalizing these values for a "generic" six foot six inch tall user, the process can then convert the global preferences to match the vehicle model, and thus achieve a reflection of what six foot six inch tall users would likely prefer as an occupant in a given vehicle. This process can be especially useful when new vehicle models are released and large volumes of data points are not yet available.

Figure 6:
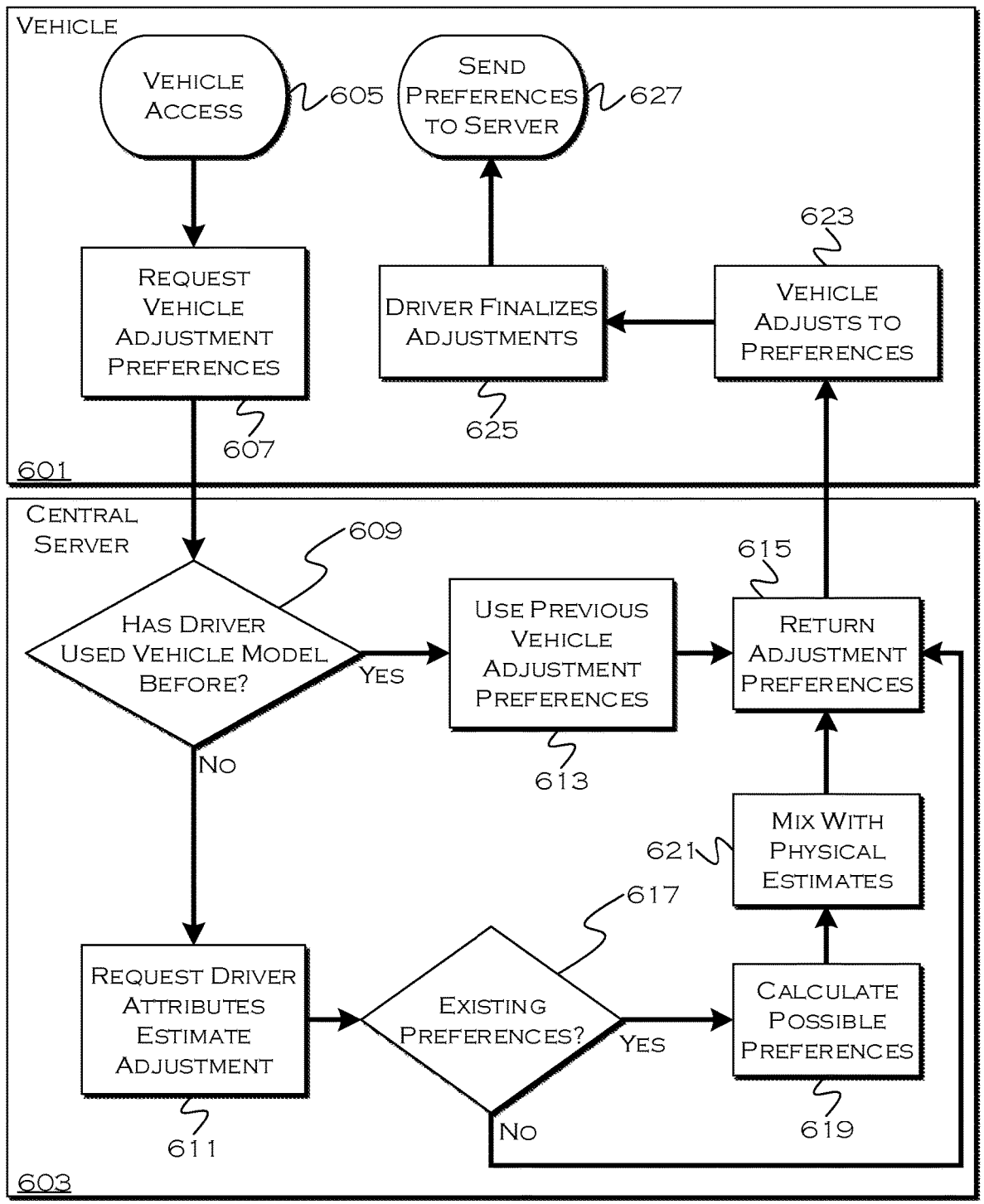
FIG. 6 shows an illustrative process combining globalized settings with dynamic configuration.

FIG. 6 shows an illustrative process combining globalized settings with dynamic configuration. In this example, the process detects 605 a request for vehicle access at a vehicle 601. In response to the vehicle access request, which will typically include a user identification (in this example), allowing retrieval of preferences, the process sends a request 607 to a central server 603 for a set of user-preferences.

At the central server, a process determines 609 if a specific set of preferences is saved with regards to the requesting vehicle (e.g., has the user already saved and set preferences for that vehicle). If the driver has already set preferences 613 for the vehicle, then, in this example, the server simply returns 615 the preset preferences.

If the user is a new user to that vehicle, the process requests 611 driver physical attributes, which can come from, for example, the requesting vehicle (via a camera), a stored driver profile or both. The process also estimates 611 preferential adjustments based on the physical characteristics of the driver.

The process on the server further determines 617 if there are any global preferences already associated with a driver profile. If such preferences exist, the process uses vehicle parameters to calculate 619 modified values to accommodate the preferences reflected onto the specific vehicle. Then, in this example, the process may blend the physical preference recommendations with the adapted global preferences. One example of this blending would be to ensure that physical limitations of the vehicle+driver do not cause collisions based on the global accommodation. Other examples may simply be of the form of recommending a certain new adjustment that may be more comfortable based on ergonomics or crowd-sourced data.

The vehicle receives the preferences from the server, and adjusts 623 the vehicle systems to accommodate the received preferences. The driver then enters 625 any final adjustments or changes, and the vehicle saves 627 the now-modified preferences for that specific vehicle. The vehicle could also convey these preferences back to the remote server.

Because the illustrative embodiments do not tie preferences to a specific vehicle, they view the idea of portable user preferences in a whole new light. This adds a new degree of function and accessibility to user preferences, and, for example, allows users who commonly only use varied vehicles for short time periods to avoid having to constantly adjust new vehicles to meet their preferences.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive a set of vehicle-specific, user-specified vehicle physical system settings for a first vehicle;
use a known first vehicle physical configuration to convert the system settings into user-centric settings, the converted settings including distances between physical components, including at least one component of the physical system set by the physical system settings, achieved in the first vehicle by the system settings; and
save the converted user-centric settings with respect to a user profile.

2. The system of claim 1, wherein a vehicle physical system includes a seat.

3. The system of claim 1, wherein a vehicle physical system includes mirrors.

4. The system of claim 1, wherein a vehicle physical system includes a steering wheel.

5. The system of claim 1, wherein the processor is configured to save the converted user-centric settings to a user mobile device.

6. The system of claim 1, wherein the processor is configured to save the converted user-centric settings to a cloud account.

7. The system of claim 1, wherein the processor is further configured to estimate user physical traits based on the converted settings.

8. The system of claim 7, wherein the processor is further configured to save the estimated user physical traits with respect to the user profile.

9. The system of claim 1, wherein the converted user-centric settings further represent at least sight angles achieved in the first vehicle by the user-centric settings.

10. A system comprising:
a processor configured to:

receive a set of user-centric settings, defining distances between physical components or sight angles preferred by a user;

receive a set of physical component placements for a specific vehicle;

convert the user-centric settings to specific settings for the specific vehicle to achieve the spacing or sight angles in the specific vehicle, based on the physical component placements and distances between physical components or sight angles defined by the user-centric settings; and wirelessly deliver the converted settings to the specific vehicle.

11. The system of claim 10, wherein the processor is further configured to:

receive a user-identification from the specific vehicle; and receive the set of user-centric settings by accessing a user profile associated with the user-identification.

12. The system of claim 10, wherein the processor is further configured to receive the set of user-centric settings from the specific vehicle.

13. The system of claim 10, wherein the processor is further configured to:

receive a user physical characteristic;

determine that a converted specific setting would cause a user to contact a physical component of the specific vehicle, based on the physical component placements and the physical characteristic; and modify the converted specific setting to accommodate the physical characteristic and avoid the contact.

14. The system of claim 13, wherein the processor is configured to receive the user physical characteristic from the specific vehicle.

15. The system of claim 13, wherein the processor is configured to receive the user physical characteristic by accessing a user profile.

16. The system of claim 11, wherein the processor is further configured to:

receive an indication that a user has modified a converted setting after the setting was applied in the specific vehicle, including a user-implemented modification;

convert the user-implemented modification to a user-centric setting; and save the converted user-centric setting with respect to a user profile.

17. A system comprising:

a processor configured to:

detect a user approaching a vehicle and responsively capture user physical data using a vehicle sensor;

determine a user physical characteristic from the physical data; and automatically adjust a vehicle physical component to accommodate the physical characteristic, to at least avoid a projected contact between the user and a vehicle physical element.

18. The system of claim 17, wherein the processor is configured to adjust the vehicle physical component based on a predefined projected most-comfortable position for a user having the determined physical characteristic.

19. The system of claim 18, wherein the predefined projected most-comfortable position is determined based on aggregated settings observed to have been previously set by other users having the same physical characteristic.

20. The system of claim 17, wherein the user physical characteristic includes at least one of limb length or height.

* * * * *